(12) United States Patent
Hase

(10) Patent No.: US 7,893,140 B2
(45) Date of Patent: Feb. 22, 2011

(54) POLYACETAL RESIN COMPOSITION

(75) Inventor: Hiroyuki Hase, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 36 days.

(21) Appl. No.: 12/306,792

(22) PCT Filed: May 14, 2007

(86) PCT No.: PCT/JP2007/060294

§ 371 (c)(1),
(2), (4) Date: Dec. 29, 2008

(87) PCT Pub. No.: WO2008/001557

PCT Pub. Date: Jan. 3, 2008

(65) Prior Publication Data

US 2009/0312466 A1    Dec. 17, 2009

(30) Foreign Application Priority Data

Jun. 30, 2006    (JP) .............................. 2006-180951

(51) Int. Cl.
| | |
|---|---|
| C08K 5/34 | (2006.01) |
| C08K 5/3435 | (2006.01) |
| C08K 5/3445 | (2006.01) |
| C08K 5/053 | (2006.01) |
| C08K 5/10 | (2006.01) |

(52) U.S. Cl. .............................. 524/91; 524/94; 524/99; 524/100; 524/102; 524/239; 524/315; 524/386; 524/472

(58) Field of Classification Search ............... 524/91, 524/94, 99, 100, 102, 472, 239, 315, 386
See application file for complete search history.

(56) References Cited

U.S. PATENT DOCUMENTS 5,232,965 A    8/1993    Hayes 6,051,660 A    4/2000    Oka
2007/0073007 A1    3/2007    Harashina

FOREIGN PATENT DOCUMENTS

| | | |
|---|---|---|
| CN | 1065470 A | 10/1992 |
| CN | 1194658 A | 9/1998 |
| JP | 61-36339 | 2/1986 |
| JP | 62-190248 | 8/1987 |
| JP | 06-256623 | 9/1994 |
| JP | 10-182928 | 7/1998 |
| JP | 11-335518 | 12/1999 |
| JP | 2000-26704 | 1/2000 |
| JP | 2000-44769 | 2/2000 |
| JP | 2000-239484 | 9/2000 |
| JP | 2002-212384 | 7/2002 |
| JP | 2003-113289 | 4/2003 |
| JP | 2005-112995 | 4/2005 |
| WO | 2004/058875 | 7/2004 |
| WO | 2005/044917 | 5/2005 |

OTHER PUBLICATIONS

International Search Report for PCT/JP2007/060294, mailed Aug. 14, 2007.

*Primary Examiner*—Kriellion A Sanders
(74) *Attorney, Agent, or Firm*—Nixon & Vanderhye P.C.

(57) ABSTRACT

The present invention provides a polyacetal resin composition having an excellent processability and stability, significantly suppressing the generation of formaldehyde from molded articles thereof, preventing exudation of components, and being excellent in weathering (light) resistance. Specifically, (A) a polyacetal copolymer having 1.0 mmol/kg or smaller quantity of a hemiformal terminal group, 2.0 mmol/kg or smaller quantity of a formyl terminal group, and 0.5% by weight or smaller quantity of an unstable terminal group is blended with (B) a hindered phenol-based antioxidant; (C) at least one compound selected from (c-1) a guanamine compound and (c-2) a hydrazide compound; (D) a hindered amine stabilizer in which the nitrogen in a piperidine derivative having a steric hindrance group is tertiary; and (E) a UV absorber in specified quantities and mixing ratios.

4 Claims, No Drawings

POLYACETAL RESIN COMPOSITION

This application is the U.S. national phase of International Application No. PCT/JP2007/060294, filed 14 May 2007, which designated the U.S. and claims priority to Japanese Application No. 2006-180951, filed 30 Jun. 2006, the entire contents of each of which are hereby incorporated by reference.

TECHNICAL FIELD

The present invention relates to a polyacetal resin composition having excellent processability and stability, significantly suppressing the generation of formaldehyde from the molded article thereof, preventing exudation of the compounded components, and giving excellent weathering (light) resistance.

BACKGROUND ART

Polyacetal resin has various excellent properties and molded articles thereof are utilized in wide-ranging fields, but it has such nature that it is likely to decompose under a heated oxidizing atmosphere, or acidic or alkaline conditions because of the chemical structural features thereof. Accordingly, as the subject for polyacetal resin, it is mentioned to give it high thermal stability to suppress the generation of formaldehyde during the molding process or from the molded articles thereof. When the thermal stability is low, the polymer decomposes through heat treatment in such a process as extrusion or molding, thus resulting in the generation of adhering matter to the mold (mold deposit), or the lowering of the moldability or mechanical properties. In addition, formaldehyde generated by the decomposition is chemically active and forms formic acid by oxidation to cause adverse effects on the thermal resistance of the polyacetal resin, or when polyacetal resin generating a large quantity of formaldehyde is used for components and the like of electric/electronic devices, formaldehyde generated or formic acid being the oxidized product thereof may be factors for causing the corrosion of metallic contact parts, or discoloration or contact error due to the adherence of an organic compound. Although a very small quantity of formaldehyde is generated from polyacetal resin molded articles under usual use conditions, the generated formaldehyde itself constitutes one of causes for contaminating work environment in component-assembling processes or use environment of final products.

Consequently, in order to stabilize polyacetal resin, an antioxidant or other stabilizers are compounded. Regarding the antioxidant to be added to polyacetal resin, there are known phenolic compounds having steric hindrance (hindered phenol), amine compounds having steric hindrance (hindered amine) and the like. As the other stabilizers, melamine, polyamide, alkali metal hydroxide, alkali earth metal hydroxide and the like are used. In addition, usually, the antioxidant is used in combination with another stabilizer. However, only by compounding such general-purpose stabilizer to polyacetal resin having ordinary formaldehyde quality, it is difficult to drastically reduce formaldehyde generated, particularly, formaldehyde generated from molded articles. Further, there are disclosed polyacetal resin compositions having been compounded with various compounds in order to solve the above problem and reduce the generation quantity of formaldehyde. For example, there are disclosed a polyacetal resin composition containing polyacetal resin and a glyoxydiureide compound [JP-A 10-182928 (claim 1)], a polyacetal resin composition containing polyacetal resin and a cyclic nitrogen-containing compound (glycocyamidine such as creatinine or derivatives thereof) [JP-A 11-335518 (claim 1)], a polyacetal resin composition containing polyacetal resin, at least one processing stabilizer selected from polyalkylene glycol, fatty acid ester, fatty acid amide and fatty acid metal salt, and at least one inhibitor selected from urea or derivatives thereof and amidine derivatives [JP-A 12-26704 (claim 1)], a polyacetal resin composition constituted of polyacetal resin, a hindered phenol-based compound, a spiro compound having a triazine ring, and at least one selected from a processing stabilizer and a heat resistance stabilizer [JP-A 2003-113289 (claim 1)], and a polyacetal resin composition obtained by compounding polyaectal resin with a guanamine derivative such as benzoguanamine as a stabilizer [JP-A 62-190248], and the like.

Further, JP-A 2005-112995 discloses a polyacetal resin composition constituted of a polyacetal copolymer with a specified terminal group and a formaldehyde inhibitor and, as the formaldehyde inhibitor, guanamine compounds, urea-based compounds, hydrazide carboxylate-based compounds and the like.

On the other hand, in order to improve the weathering resistance of polyacetal resin, JP-A 61-36339 discloses a composition obtained by adding a benzotriazole-based material or the like and a hindered amine-based material to polyacetal resin to coexist. Further, JP-A 6-256623 discloses a composition for which weathering (light) resistance and thermal stability have been improved by compounding an antioxidant, tetrakis[methylene-3-(3',5'-di-t-butyl-4'-hydroxyphenyl)-propionate]methane, a light stabilizer, bis-[N-methyl-2,2,6,6-tetramethyl-4-piperidinyl sebacate, and a UV absorber, 2-[2'-hydroxy-3',5'-bis-(α,α-dimethylbenzyl)phenyl]-benzotriazole.

According to the techniques disclosed in JP-A 10-182928 (claim 1), JP-A 11-335518 (claim 1), JP-A 12-26704 (claim 1), JP-A 2003-113289 (claim 1), JP-A 62-190248 and JP-A 2005-112995, it is possible to significantly reduce the generation of formaldehyde from polyacetal resin, and according to the techniques disclosed in JP-A 61-36339 and JP-A 6-256623, it is possible to impart excellent weathering resistance to polyacetal resin.

Only a simple combination of these techniques can not bring, however, the additive property of effects into existence. In particular, when a hindered phenol and a hindered amine are used in combination, an opposing effect lowers thermal stability and light stability, thereby making it very difficult to obtain a resin substance having an excellent weathering resistance, significantly suppressing the generation of formaldehyde, and having no such problem as defective appearance due to the exudation of compounded components.

DISCLOSURE OF THE INVENTION

A purpose of the present invention is to provide a polyacetal resin composition having excellent weathering (light) resistance, capable of significantly suppressing the generation of formaldehyde from molded articles thereof to very low levels, and also suppressing the exudation of the compounded components.

The present inventors have worked hard in order to solve the above-described problems and, as the result, have found that the purpose can be achieved by strictly controlling the combination of specified compounding components, compounding quantities and a compounding ratio, to complete the present invention.

That is, the present invention relates to a polyacetal resin composition, obtained by blending (A) 100 parts by weight of a polyacetal copolymer having 1.0 mmol/kg or smaller quantity of a hemiformal terminal group, 2.0 mmol/kg or smaller quantity of a formyl terminal group, and 0.5% by weight or smaller quantity of an unstable terminal group with:

(B) 0.03 to 0.30 parts by weight of a hindered phenol-based antioxidant;

(C) 0.05 to 0.8 parts by weight of at least one compound selected from a guanamine compound (c-1) and a hydrazide compound (c-2);

(D) 0.2 to 1 part by weight of a hindered amine stabilizer in which the nitrogen in a piperidine derivative having a steric hindrance group is tertiary; and (E) 0.2 to 1 part by weight of a UV absorber;

the ratio of the (B) hindered phenol-based antioxidant to the (D) hindered amine stabilizer, (B/D), being within the range of 0.03 to 0.5, the ratio of the (D) hindered amine stabilizer to the (E) UV absorber, (D/E), being within the range of 0.5 to 2.0, and the total amount of the (D) hindered amine stabilizer and the (E) UV absorber, (D+E), being within the range of 0.5 to 1.5 parts by weight.

In the present invention, since the polyacetal resin and compounding components to be used are selectively combined and the compounding quantity and ratio thereof are strictly controlled, it is possible to suppress the generation of formaldehyde from the molded articles to very low levels, to provide excellent weathering (light) resistance, and, further, to suppress the exudation and the like.

DETAILED DESCRIPTION OF THE INVENTION

As mentioned above, the polyacetal resin composition of the present invention is constituted by containing the (A) polyacetal copolymer having specified terminal properties, the (B) hindered phenol-based antioxidant, the (C) guanamine compound or hydrazide compound, the (D) hindered amine stabilizer in which the nitrogen in a piperidine derivative having a steric hindrance group is tertiary, and the (E) UV absorber.

Such constituents and compounding quantities of the present invention were able to be achieved for the first time based on the following findings by the present inventors as the result of studies. That is, in the case of polyacetal resin, when a hindered phenol-based antioxidant and a general hindered amine stabilizer are used in combination, the additive property of the effects is damaged, resulting in insufficient improvement in thermal stability or weathering resistance. In contrast, the hindered amine stabilizer in which the nitrogen in a piperidine derivative having a steric hindrance group is tertiary shows selective effects, and the combined addition of the specified hindered amine stabilizer and a hindered phenol-based antioxidant in limited compounding quantities and at a limited compounding ratio can suppress the opposing effect to provide excellent weathering resistance and thermal stability. In addition, by using the polyacetal copolymer having specified terminal properties as a substrate resin, and, further, by combining it with a guanamine compound or a hydrazide compound, it is possible to suppress the generation of formaldehyde from the molded articles to very low levels. On the other hand, regarding the exudation of components, the use of the polyacetal copolymer having specified terminal properties often affects disadvantageously the exudation of components. In addition, exudation components or exudation quantities varies through the action of components. Therefore, the compounding quantity of components and the compounding ratio of the specified component must strictly be controlled, which gives a molding substance having excellent weathering resistance, significantly suppressing the generation of formaldehyde, and causing no such problem as defective appearance due to the exudation.

Hereinafter, the present invention will be described in detail.

(A) Polyacetal Copolymer

In the present invention, the (A) polyacetal copolymer having specified terminal properties is used as a substrate resin. The polyacetal copolymer is a resin having an oxymethylene group, ($-OCH_2-$) as a main constitutional unit and having other comonomer units except the oxymethylene unit. It is generally manufactured by copolymerizing formaldehyde or cyclic oligomer of formaldehyde as a main monomer with a compound selected from cyclic ether and cyclic formal as a comonomer, and, usually, an unstable part at the terminal is removed by hydrolysis to be stabilized for heat decomposition. In particular, for the main monomer, trioxane, the cyclic trimer of formaldehyde is generally used. Trioxane is generally obtained through the reaction of an aqueous formaldehyde solution in the presence of an acidic catalyst, and the obtained one is then purified by such a method as distillation to be used. Preferably, trioxane for use in polymerization contains such impurities as water, methanol and formic acid as few as possible, as mentioned later. Examples of cyclic ethers and cyclic formals being a comonomer include ethylene oxide, propylene oxide, butylene oxide, cyclohexene oxide, oxetane, tetrahydrofuran, trioxepane, 1,3-dioxane, 1,3-dioxolan, propylene glycol formal, diethylene glycol formal, triethylene glycol formal, 1,4-butanediol formal, and 1,6-hexanediol formal. Further, it is also possible to use a compound that can form a branched structure or a cross-linked structure as a comonomer (or a termonomer). Examples of such compounds include alkyl or aryl glycidyl ethers such as methyl glycidyl ether, ethyl glycidyl ether, butyl glycidyl ether, 2-ethyl-hexyl glycidyl ether or phenyl glycidyl ether; and diglycidyl ethers of alkylene glycol or polyalkylene glycol such as ethylene glycol diglycidyl ether, triethylene glycol diglycidyl ether or butanediol diglycidyl ether. These comonomers may be used either alone or in combination of two or more kinds.

Such polyacetal copolymer as described above can generally be obtained by cationic polymerization using a cationic polymerization catalyst while adding an appropriate quantity of a molecular weight-controlling agent. The molecular weight-controlling agent, cationic polymerization catalyst, polymerization method, polymerization apparatus, deactivation treatment of the catalyst after the polymerization, and the method for the terminal stabilization treatment of crude polyacetal copolymer obtained by the polymerization are publicly known by various documents, any of which is basically utilizable.

The molecular weight of polyacetal copolymer for use in the present invention is not particularly limited, but polyacetal copolymers having a weight-average molecular weight ranging from about 10,000 to 400,000 are preferable. In addition, those having a melt index being the indicator of flowability of a resin (measured at 190° C. with a load of 2.16 Kg according to ASTM-D1236) ranging from 0.1 to 100 g/10 min are preferable, and from 0.5 to 80 g/10 min are more preferable.

The (A) polyacetal copolymer for use in the present invention is required to have specified terminal properties as described above, and more specifically, is indispensable to having 1.0 mmol/kg or smaller quantity of a hemiformal terminal group, 2.0 mmol/kg or smaller quantity of a formyl terminal group, and 0.5% by weight or smaller quantity of an unstable terminal group.

Here, the hemiformal terminal group is a group represented as —OCH$_2$OH, which is also referred to as a hydroxymethoxy group or a hemiacetal terminal group. In addition, the formyl terminal group is represented as —CHO. The quantity of such hemiformal terminal group and formyl terminal group can be obtained by $^1$H-NMR measurement. Regarding the specific measurement method thereof, the method described in JP-A 2001-11143 can be referred to. The quantity of unstable terminal groups shows the quantity of parts that exist at the terminal portion of the polyacetal copolymer and that are unstable against heat and base to easily decompose. The quantity of such unstable terminal groups is a value obtained as follows. 1 g of polyacetal copolymer and 100 ml of a 50% (volume %) aqueous methanol solution containing 0.5% (volume %) ammonium hydroxide were put in a pressure tight vessel to be heat-treated at 180° C. for 45 minutes, which was then cooled and opened, and the quantity of formaldehyde having decomposed and dissolved in the solution obtained was measured, and then the quantity was shown by weight % relative to the polyacetal copolymer.

When the (A) polyacetal copolymer to be used is one that does not have the above-described terminal properties and has a quantity over the upper limit, a polyacetal resin composition for which the generation of formaldehyde is sufficiently reduced can not be obtained and it becomes difficult to maintain the quantity of formaldehyde generated by the repetition of thermal history to low levels. From this standpoint, the (A) polyacetal copolymer for use in the present invention has the quantity of the hemiformal terminal group preferably of 0.8 mmol/kg or smaller, more preferably 0.6 mmol/kg or smaller. For the quantity of the formyl terminal group, the polyacetal copolymer having 1.5 mmol/kg or smaller is preferable, and the one having 1.0 mol/kg is further preferable. For the quantity of the unstable terminal group, the polyacetal copolymer having 0.4% by weight or smaller is preferable, and the one having 0.3% by weight or smaller is more preferable. The lower limit of the hemiformal terminal group, the formyl terminal group, and the unstable terminal group is not particularly limited.

As described above, the (A) polyacetal polymer having specified terminal properties can be produced by reducing impurities contained in the monomer and comonomer, and by selecting the production process and optimizing the production conditions thereof.

Hereinafter, there is mentioned a specific example of a method for producing the (A) polyacetal polymer having specified terminal properties satisfying the requirement of the present invention. But the production method is not limited to this.

First, it is important to lessen active impurities forming an unstable terminal in the polymerization system, specifically, such impurities as water, alcohol (for example, methanol) and acid (for example, formic acid) contained in the monomer and comonomer. The total quantity of these active impurities is preferably $1\times10^{-2}$ mol % or smaller relative to the total monomer in a reaction system, more preferably $5\times10^{-3}$ mol % or smaller. Too great a content thereof is, naturally, not preferable for obtaining a polyacetal polymer having a small quantity of the unstable terminal part. Meanwhile, an arbitrary quantity of a chain transfer agent that does not form an unstable terminal, for example, a low-molecular-weight linear acetal having alkoxy groups at both terminals such as methylal may be incorporated to control the molecular weight of polyacetal polymer.

Next, the quantity of a catalyst for use at the time of polymerization reaction is an important requirement. When using a catalyst constituted of boron trifluoride or a coordination compound thereof, the quantity is preferably within the range of $5\times10^{-3}$ to $1\times10^{-2}$ mol % relative to the total monomer, particularly preferably $1\times10^{-3}$ to $7\times10^{-3}$ mol %. The quantity of the catalyst within such limited range is effective in preventing the generation of the unstable terminal part. Too large a quantity of the catalyst makes the correct control of polymerization temperature difficult and decomposition reaction in the polymerization dominant, and makes it difficult to obtain a polyacetal polymer having a small quantity of the unstable terminal part, which satisfies the requirement of the present invention. On the other hand, too small a quantity of the catalyst results in the lowering of the polymerization reaction speed or the polymerization yield, which is not preferable.

The quantity and kind of the comonomer remarkably influence the thermal stability of polyacetal polymer. For the (A) polyacetal polymer of the present invention, preferable is one obtained by copolymerizing (a-1) trioxane and (a-2) one or more compounds selected from cyclic ethers and cyclic formals at a ratio (weight ratio) of the former (a-1)/the latter (a-2)=99.9/0.1 to 80.0/20.0, and further preferable is one obtained by copolymerizing those at a ratio (weight ratio) of the former/the latter=99.5/0.5 to 90.0/10.0. For the (a-2) compound selected from cyclic ethers and cyclic formals, ethylene oxide, 1,3-dioxolan, 1,4-butanediol formal, and diethylene glycol formal are particularly preferable.

For the polymerization method, any of publicly known methods is usable, but a continuous bulk polymerization method, in which by using a liquid monomer, a solid powder block-like polymer is obtained with the progress of the polymerization, is preferable industrially, wherein the polymerization temperature is desirably maintained at 60 to 105° C., particularly at 65 to 100° C.

When a catalyst composed of boron trifluoride or a coordination compound thereof is used, for the deactivation method after the polymerization, there is such possible method that the polymer after the polymerization is added to an aqueous solution containing a basic compound, and the like. But, in order to obtain the polyacetal polymer that satisfies the requirement of the present invention, preferably the polymer obtained by the polymerization reaction is pulverized, subdivided and contacted with a deactivator for the purpose of prompt deactivation of the catalyst. For example, the polymer subjected to the deactivation of the catalyst is pulverized, desirably subdivided so that 80% by weight or larger, preferably 90% by weight thereof have a particle diameter of 1.5 mm or smaller, and 15% by weight or larger, preferably 20% by weight or larger thereof have a particle diameter of 0.3 mm or smaller. For the basic compound for deactivating the polymerization catalyst, there can be used ammonia, or amines such as triethylamine, tributylamine, triethanolamine or tributanolamine; or oxides, hydroxides and salts of alkali metal and alkali earth metal; or other publicly known catalyst deactivators. These basic compounds are preferably added as an aqueous solution within the range of 0.001 to 0.5% by weight, in particular 0.02 to 0.3% by weight. The temperature of the aqueous solution is preferably within the range of 10 to 80° C., particularly preferably 15 to 60° C. After the completion of the polymerization, preferably, the polymer is promptly thrown into these aqueous solutions to deactivate the catalyst.

Prior to the polymerization, by adding 0.01 to 0.1% by weight of a hindered phenol-based antioxidant relative to the total monomer into the monomer and performing the polymerization in the presence of the antioxidant, depolymerization during the polymerization can be inhibited as the antioxidant exists uniformly in the polymerization reaction system, and oxidation decomposition in the after-treatment process such as drying and the like, or in the stabilization process after the polymerization can also be suppressed.

The reduction of impurities contained in monomer and comonomer, the selection of production process, the optimization of the production condition thereof and the like as described above allow a polyacetal polymer having a small quantity of unstable terminal group to be produced, and, if required, further reduction of the quantity of unstable terminal group is possible by going through a stabilizing process. For the stabilizing process, there are mentioned decomposing and removing only the unstable part by heating the polyacetal polymer at a temperature higher than the melting point thereof and treating it in a molten state, and decomposing and removing only the unstable part by heat treatment at a temperature of 80° C. or higher while maintaining a heterogeneous system in an insoluble liquid medium.

(B) Hindered Phenol-Based Antioxidant

The (B) hindered phenol-based antioxidant for use in the present invention includes monocyclic hindered phenolic compounds, polycyclic hindered phenolic compounds linked via a hydrocarbon group or sulfur atom-containing group, hindered phenolic compounds having an ester group or amide group, and the like. Specific examples of these include 2,6-di-t-butyl-p-cresol, 2,2'-methylene-bis(4-methyl-6-t-butylphenol), 4,4'-methylene-bis(2,6-di-t-butylphenol), 1,1,3-tris(2-methyl-4-hydroxy-5-t-butylphenyl)butane, 4,4'-butylidene-bis(3-methyl-6-t-butylphenol), 1,3,5-trimethyl-2,4,6-tris(3,5-di-t-butyl-4-hydroxybenzyl)benzene, 4,4'-thio-bis(3-methyl-6-t-butylphenol), n-octadecyl-3-(4'-hydroxy-3',5'-di-t-butylphenyl)propionate, n-octadecyl-2'-(4'-hydroxy-3',5'-di-t-butylphenyl)propionate, 1,6-hexanediol-bis[3-(3,5-di-t-butyl-4-hydroxyphenyl)-propionate], ethylene-bis(oxyethylene)-bis[3-(3-(5-t-butyl-4-hydroxy-m-tolyl)propionate), pentaerythritoltetrakis-[3-(3,5-di-t-butyl-4-hydroxyphenyl)propionate], 3,9-bis[2-{3-(3-t-butyl-4-hydroxy-5-methylphenyl)propionyloxy}-1,1-dimethylethyl]-2,4,8,10-tetraoxaspiro[5,5]undecane, 2-t-butyl-6-(3'-t-butyl-5'-methyl-2'-hydroxybenzyl)-4-methylphenyl acrylate, 2-[1-(2-hydroxy-3,5-di-t-pentylphenyl)ethyl]-4,6-di-t-pentylphenyl acrylate, di-n-octadecyl-3,5-di-t-butyl-4-hydroxybenzyl phosphonate, N,N'-hexamethylene-bis(3,5-di-t-butyl-4-hydroxy-dihydrocinnamamide, N,N'-ethylene-bis[3-(3,5-di-t-butyl-4-hydroxyphenyl)propionamide], N,N'-tetramethylene-bis[3-(3,5-di-t-butyl-4-hydroxyphenyl)propionamide], N,N'-hexamethylene-bis[3-(3,5-di-t-butyl-4-hydroxyphenyl)-propionamide], N,N'-ethylene-bis[3-(3-t-butyl-5-methyl-4-hydroxyphenyl)propionamide], N,N'-hexamethylene-bis[3-(3-t-butyl-5-methyl-4-hydroxyphenyl)propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]-hydrazine, 1,3,5-tris(3,5-di-t-butyl-4-hydroxybenzyl)-isocyanulate, and 1,3,5-tris(4-t-butyl-3-hydroxy-2,6-dimethylbenzyl)isocyanulate.

These (B) hindered phenol-based antioxidants may be used either alone or in combination of two or more kinds. The additive amount of the (B) hindered phenol-based antioxidant is within the range of 0.03 to 0.30 parts by weight relative to 100 parts by weight of the (A) polyacetal copolymer. An amount smaller than this causes insufficient effects, and an amount larger than this degrades weathering (light) resistance due to the opposing effect on a hindered amine stabilizer.

(C) (c-1) Guanamine Compound and (c-2) Hydrazide Compound

For the (c-1) guanamine compound for use in the present invention, melamine, aliphatic guanamine-based compounds, alicyclic guanamine-based compounds, aromatic guanamine-based compounds, and heteroatom-containing guanamine-based compounds are applicable.

Examples of aliphatic guanamine-based compounds include monoguanamines such as valeroguanamine, caproguanamine, heptanoguanamine, capryloguanamine or stearoguanamine; and alkylene-bisquanamines such as succinoguanamine, glutaroguanamine, adipoguanamine, pimeloguanamine, suberoguanamine, azeloguanamine or sebacoguanamine.

Examples of alicyclic guanamine-based compounds include monoguanamines such as cyclohexane carboguanamine, norbornene carboguanamine, cyclohexene carboguanamine, norbornane carboguanamine; and derivatives in which one to three functional groups such as an alkyl group, a hydroxyl group, an amino group, an acetoamino group, a nitrile group, a carboxyl group, an alkoxycarbonyl group, a carbamoyl group, an alkoxy group, a phenyl group, a cumyl group and a hydroxyphenyl group are substituted onto the cycloalkane residue thereof.

Examples of aromatic guanamine-based compounds include benzoguanamine and derivatives in which 1 to 5 functional groups such as an alkyl group, a hydroxyl group, an amino group, an acetoamino group, a nitrile group, a carboxyl group, an alkoxycarbonyl group, a carbamoyl group, an alkoxy group, a phenyl group, a cumyl group and a hydroxyphenyl group are substituted onto the phenyl residue thereof (for example, toluguanamine, xyloguanamine, phenylbenzoguanamine, hydroxybenzoguanamine, 4-(4'-hydroxyphenyl)benzoguanamine, nitrilebenzoguanamine, 3,5-dimethyl-4-hydroxybenzoguanamine, 3,5-di-t-butyl-4-hydroxybenzoguanamine); monoguanamines such as naphthoguanamine and derivatives in which such functional group as described above is substituted onto the naphthyl residue thereof; polyguanamines such as phthaloguanamine, isophthaloguanamine, terephthaloguanamine, naphthalene-diguanamine or biphenylenediguanamine; aralkyl- or aralkylene-guanamines such as phenylacetoguanamine, β-phenylpropyoguanamine or xylylene-bisguanamine.

Examples of heteroatom-containing guanamine-based compounds include acetal group-containing guanamines such as 2,4-diamino-6-(3,3-dimethoxypropyl)-s-triazine; dioxane ring-containing guanamines such as [2-(4'-6'-diamino-s-triazine-2'-yl)ethyl]-1,3-dioxane, [2-(4'-6'-diamino-s-triazine-2'-yl)ethyl]-4-ethyl-4-hydroxymethyl-1,3-dioxane; tetraoxospiro ring-containing guanamines such as CTU-guanamine or CMTU-guanamine; isocyanuric ring-containing guanamines such as 1,3,5-tris[2-(4',6'-diamino-s-triazine-2'-yl)ethyl]isocyanurate or 1,3,5-tris[3-(4',6'-diamino-s-triazine-2'-yl)-propyl]isocyanurate; imidazoyl ring-containing guanamines such as guanamine compounds described in JP-A 6-179671 and JP-A 7-10871; imidazole ring-containing guanamines such as guanamine compounds described in JP-A 47-41120, JP-A 3-284675 and JP-A 7-33766; and guanamine compounds described in JP-A 2000-154181.

Further, there are included compounds formed by substituting the hydrogen atom of the amino group in the above-described guanamine compounds by an alkoxymethyl group, for example, mono- to tetra-methoxymethyl benzoguanamines and mono- to octa-methoxymethyl CTU-guanamines.

Among these guanamine compounds, particularly preferable ones are melamine, benzoguanamine and CTU-guanamine.

For the (c-2) hydrazide compound for use in the present invention, aliphatic or alicyclic carboxylic acid hydrazides, aromatic carboxylic acid hydrazides and the like are applicable.

Examples of aliphatic or alicyclic carboxylic acid hydrazides include saturated or unsaturated fatty acid hydrazides such as lauric acid hydrazide, palmitic acid hydrazide, stearic acid hydrazide, adipic acid dihydrazide, sebacic acid hydrazide, dodecane diacid dihydrazide, eicosane diacid dihydrazide or sorbic acid hydrazide; oxy fatty acid hydrazide such as α-oxybutyric acid hydrazide or glyceric acid hydrazide; 7,11-octadecadiene-1,18-dicarbohydrazide, 1,3-bis(hydrazinocarbonoethyl)-5-isopropylhydantoin, and tris(hydrazinocarbonoethyl)isocyanulate.

Examples of aromatic hydrazides include 1-naphthoic acid hydrazide, 2-naphthoic acid hydrazide, phthalic acid dihydrazide, isophthalic acid dihydrazide, terephthalic acid dihydrazide and 2,6-naphthoic acid dihydrazide.

A compound selected from such (c-1) guanamine-based compound and (c-2) hydrazide compound as described above is added within the range of 0.05 to 0.8 parts by weight, preferably 0.07 to 0.5 parts by weight relative to 100 parts by weight of the (A) polyacetal copolymer, in the present invention. When the compounding quantity of the (C) compound is too small, it is impossible to obtain a polyacetal resin composition that generates sufficiently reduced quantity of formaldehyde, and is also difficult to maintain the quantity of formaldehyde generated by repeating thermal history to low levels. In contrast, when the compounding quantity of the (C) compound is too large, there occur such problems as the lowering of mechanical properties and defective appearance due to the exudation.

(D) Hindered Amine Stabilizer in which the Nitrogen in a Piperidine Derivative Having a Steric Hindrance Group is Tertiary Examples of hindered amine stabilizers for use in the present invention, in which the nitrogen in a piperidine derivative having a steric hindrance group is tertiary, include aliphatic di- or tri-carboxylic acid-bis- or tris-piperidyl ester—such as bis(1,2,2,6,6-pentamethyl-4-piperidyl)adipate or bis(1-octyloxy-2,2,6,6-tetramethyl-4-piperidyl sebacate ($C_{2-20}$ aliphatic dicarboxylic acid-bispiperidyl ester and the like), N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine, the polymerization product of dimethyl succinate and 4-hydroxy-2,2,6,6-tetramethyl-1-piperidine ethanol, decane diacid-bis (2,2,6,6-tetramethyl-1-(octyloxy)-4-piperidinyl)ester, bis(1,2,2,6,6-pentamethyl-4-piperidyl)[[3,5-bis(1,1-dimethylethyl)-4-hydroxyphenyl]-methyl]butyl malonate, bis(1,2,2,6,6-pentamethyl-4-piperidyl)sebacate, methyl 1,2,2,6,6-pentamethyl-4-piperidyl sebacate, tetrakis(1,2,2,6,6-pentamethyl-4-piperidyl)-1,2,3,4-butane tetracarboxylate, a condensation product of 1,2,3,4-butane tetracarboxylic acid, 1,2,2,6,6,-pentamethyl-4-piperidinol and tridecylalcohol; a condensation product of 1,2,3,4-butane tetracarboxylic acid, 1,2,2,6,6,-pentamethyl-4-piperidinol and β,β,β',β'-tetramethyl-3,9-(2,4,8,10-tetraoxaspiro[5,5]undecane)-diethanol; a reaction product of peroxidation-treated 4-butylamino-2,2,6,6,-tetramethylpiperidine, 2,4,6-trichloro-1,3,5-triazine, cyclohexane, and N,N'-ethane-1,2-diyl-bis(1,3-propanediamine); and 1-[2-(3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine.

For particularly preferable ones, there are mentioned tetrakis(1,2,2,6,6-pentamethyl-4-piperidyl)1,2,3,4-butane tetracarboxylate; a condensation product of 1,2,3,4-butanetetracarboxylic acid, 1,2,2,6,6,-pentamethyl-4-piperidinol and β,β,β',β'-tetramethyl-3,9-(2,4,8,10-tetraoxaspiro[5,5]undecane)-diethanol; and a polymerization product of dimethyl succinate and 4-hydroxy-2,2,6,6-tetramethyl-1-piperidine ethanol.

In the present invention, the (D) hindered amine stabilizer in which the nitrogen in a piperidine derivative having a steric hindrance group is tertiary is added within the range of 0.2 to 1 part by weight, preferably 0.4 to 0.8 parts by weight relative to 100 parts by weight of the (A) polyacetal copolymer.

When the compounding quantity of the (D) hindered amine stabilizer is too small, a polyacetal resin composition excellent in weathering resistance can not be obtained and, in contrast, when the compounding quantity is too large, there occur such problems as the lowering of mechanical properties and defective appearance due to the exudation.

(E) UV Absorber

The UV absorbers include benzotriazole-based compounds and anilide oxalate-based compounds. These weathering (light) stabilizers can be used either alone or in combination of two or more kinds.

Examples of benzotriazole-based compounds include benzotriazoles having a hydroxyl group- and alkyl ($C_{1-6}$ alkyl) group-substituted aryl group such as 2-(2H-benzotriazole-2-yl)-P-cresol, 2-(2H-benzotriazole-2-yl)-4-6-bis(1-methyl-1-phenylethyl)-phenol, 2-[5-chloro(2H)-benzotriazole-2-yl]-4-methyl-6-(tert-butyl)phenol, 2,4-di-tert-butyl-6-(5-chlorobenzotriazole-2-yl)phenol, 2-(2H-benzotriazole-2-yl)-4,6-di-tert-pentylphenol, 2-(2H-benzotriazole-2-yl)-4-(1,1,3,3-tetramethylbutyl)phenol, or 2-(2'-hydroxy-3',5'-diisoamylphenyl)benzotriazole; benzotriazoles having a hydroxyl group and aralkyl (or aryl) group-substituted aryl group such as 2-[2'-hydroxy-3',5'-bis(α,α-dimethylbenzyl)phenyl]benzotriazole; and benzotriazoles having a hydroxyl group and alkoxy ($C_{1-12}$ alkoxy) group-substituted aryl group such as 2-(2'-hydroxy-4'-octoxyphenyl)benzotriazole.

These benzotriazole compounds can be used either alone or in combination of two or more kinds.

Among these benzotriazole-based compounds, 2-(2H-benzotriazole-2-yl)-4,6-bis(1-methyl-1-phenylethyl)-phenol, 2-(2H-benzotriazole-2-yl)-4,6-di-tert-pentylphenol, 2-(2H-benzotriazole-2-yl)-4-(1,1,3,3-tetramethylbutyl)-phenol and the like are preferable.

Examples of anilide oxalate-based compounds include N-2-ethyphenyl)-N'-(2-ethoxy-5-t-butylphenyl)oxalic acid diamide, N-(2-ethylphenyl)-N'-(2-ethoxy-phenyl)oxalic acid diamide and oxalic diamides having an aryl group that may be substituted, or the like on a nitrogen atom. These anilide oxalate compounds may be used either alone or in combination of two or more kinds.

In the present invention, the (E) UV absorber as described above is added within the range of 0.2 to 1.0 part by weight, preferably 0.4 to 0.8 parts by weight relative to 100 parts by weight of the (A) polyacetal copolymer. When the compounding quantity of the (E) UV absorber is too small, a polyacetal resin composition excellent in weathering resistance can not be obtained and, in contrast, when the compounding quantity is too large, there occur such problems as the lowering of mechanical properties and defective appearance due to the exudation.

(F) (f-1) Fatty Acid Ester, and (f-2) Polyalkylene Glycol

The fatty acid that is a constituent of the (f-1) fatty acid ester is one kind or two or more kinds of saturated or unsaturated fatty acids. Examples of these fatty acids include acetic acid, propionic acid, butyric acid, caproic acid, capric acid, undecylic acid, pivalic acid, caprylic acid, lauric acid, tridecylic acid, isotridecylic acid, myristic acid, pentadecylic acid, palmitic acid, heptadecylic acid, stearic acid, 12 hydroxystearic acid, nonadecanoic acid, arachidic acid, behenic acid, lignoceric acid, cerotic acid, heptacosanic acid, montanic acid, melissic acid, laccelic acid, oleic acid, elaidic acid, linoleic acid, linolenic acid, arachidonic acid, cetoleic acid and erucic acid. Fatty acids having 12 carbon atoms or more are preferable. For the alcohol that is the constituent of the (f-1) fatty acid ester, either of monovalent alcohols (for example, stearyl alcohol) and polyvalent alcohols may be usable, but polyvalent alcohols are preferable. Examples of polyvalent alcohols include $C_{2-6}$ alkylene glycols such as ethylene glycol, propylene glycol or tetramethylene glycol, diethylene glycol, glycerin and pentaerythritol. There are also mentioned, as preferable polyvalent alcohols for constituting the (f-1) fatty acid ester, poly-$C_{2-6}$-oxyalkylene glycols such as polyethylene glycol, polypropylene glycol or polytetramethylene glycol, copolymers such as polyoxyethylene-polyoxypropylene copolymer (random or block copolymer, and the like), polyoxyethylene polyoxypropylene glyceryl ether or polyoxyethylene polyoxypropylene monobutyl ether. More preferable polyoxyalkylene glycols are polymers having an oxyethylene unit such as, for example, polyethylene glycol, polyoxyethylene-polyoxypropylene copolymer, and derivatives thereof. Further, the number-average molecular weight of the above-described polyoxyalkylene glycol is within the range of $1 \times 10^3$ to $1 \times 10^6$ (for example, $1 \times 10^3$ to $5 \times 10^5$), preferably about $2 \times 10^3$ to $1 \times 10^5$ (for example, $2 \times 10^3$ to $5 \times 10^4$).

Preferable (f-1) fatty acid esters include esters of a fatty acid having 12 carbon atoms or more and a polyalkylene glycol having the average polymerization degree ranging from about 20 to 300.

For the (f-2) polyalkylene glycol, at least one selected from homopolymers and copolymers such as polyethylene glycol, polypropylene glycol, polytetramethylene glycol or polyglycerin, and the like can be used, wherein polyalkylene glycols having average polymerization degree of about 20 to 300 are preferable.

In the present invention, compounding the above-described compound selected from the (F) (f-1) fatty acid ester and (f-2) polyalkylene glycol is not indispensable, but when compounding these compounds, effects that promote the improvement of weathering resistance occur. The quantity of the (F) compound when compounded is within the range of 0.01 to 5.0 parts by weight relative to 100 parts by weight of the (A) polyacetal copolymer, preferably 0.05 to 2.0 parts by weight.

In addition, in the polyacetal resin composition of the present invention, it is essential that the compounding ratio of the (B) hindered phenol-based antioxidant to the (D) hindered amine stabilizer, (B/D), is within the range of 0.03 to 0.5, that the compounding ratio of the (D) hindered amine stabilizer to the (E) UV absorber (E), (D/E), is within the range of 0.5 to 2.0, and that the total quantity of the (D) hindered amine stabilizer and the (E) UV absorber (E), (D+E), is within the range of 0.5 to 1.5 parts by weight.

The compounding ratio of the (B) hindered phenol-based antioxidant to the (D) hindered amine stabilizer, (B/D), being smaller than 0.05 causes such a problem as an insufficient thermally stabilizing effect, and the ratio being larger than 0.5 causes such a problem as the lowering of weathering resistance.

The compounding ratio of the (D) hindered amine stabilizer to the (E) UV absorber, (D/E), being smaller than 0.5 causes such a problem as the exudation of the UV absorber, and the ratio being larger than 2.0 causes such problems as the exudation of the hindered amine stabilizer and the lowering of the weathering resistance.

The total compounding quantity of the (D) hindered amine stabilizer and the (E) UV absorber, (D+E), being smaller than 0.5 parts by weight causes such a problem as the lowering of weathering resistance, and the quantity being larger than 1.5 parts by weight causes such a problem as exudation.

To the polyacetal resin composition of the present invention, in order to improve thermal stability, long-term thermal stability and the like, a metal salt of an organic carboxylic acid, a metal oxide, or metal hydroxide can further be added.

For the organic carboxylic acid for forming a metal salt of the organic carboxylic acid, various aliphatic carboxylic acids having about 1 to 34 carbon atoms are usable, including saturated aliphatic monocarboxylic acids, saturated aliphatic dicarboxylic acids, unsaturated aliphatic monocarboxylic acids, unsaturated aliphatic dicarboxylic acids, and oxyacids thereof. These aliphatic carboxylic acids may be one having a hydroxyl group. Further, these may be copolymers of a polymerizable unsaturated carboxylic acid (such as (meth) acrylic acid, maleic acid, fumaric acid, maleic anhydride or monoethyl maleate) and an olefin. Specific examples of metal salts of an organic carboxylic acid include alkali metal salts of organic carboxylic acids such as lithium citrate, potassium citrate, sodium citrate, lithium stearate or lithium 12-hydroxy stearate; alkali earth metal salts of organic carboxylic acids such as magnesium acetate, calcium acetate, magnesium citrate, calcium citrate, calcium stearate, magnesium stearate, magnesium 12-hydroxy stearate or calcium 12-hydroxy stearate; and ionomer resins. Among these metal salts of organic carboxylic acids, alkali earth metal salts such as calcium citrate, magnesium stearate, calcium stearate, magnesium 12-hydroxy stearate or calcium 12-hydroxy stearate, and ionomer resins are preferable.

Regarding metal oxides and metal hydroxides, calcium oxide, magnesium oxide, zinc oxide, calcium hydroxide, magnesium hydroxide and the like are preferable.

To the polyacetal resin composition of the present invention, in addition, there may be compounded an impact resistance-improving agent, a glazing-controlling agent, a sliding-improving agent, a filler, a colorant, a nucleating agent, a mold lubricant, an antistatic agent, a surfactant, an antibacterial agent, an antifungal agent, an aromatic substance, a foaming agent, a compatibilizing agent, a physical property-improving agent (such as boric acid or derivatives thereof), a perfume and the like, which can improve various properties in accordance with respective additives without damaging the purpose of the present invention. In addition, antioxidants, heat resistant stabilizer, processability-improving agent and the like except those as described above can be used in combination.

The impact resistance-improving agent includes thermoplastic polyurethane-based resins, acrylic-based core/shell polymers, thermoplastic polyester-based elastomers, styrene-based elastomers, olefin-based elastomers, polyamide-based elastomers, rubber components (such as natural rubber) and the like.

The glazing-controlling agent includes acrylic-based core/shell polymers, thermoplastic polyurethane, thermoplastic polyester elastomer, polyamide-based elastomers, homo- and co-polymers of alkyl(meth)acrylate (such as polymethyl methacrylate), polycarbonate-based resins, styrene-based resins (such as polystyrene, AS resin or AES resin) and olefin-based resins (such as polypropylene or cyclic polyolefin).

The sliding-improving agent includes olefin-based polymers (such as polyethylene, polypropylene, copolymer of ethylene and α-olefin, and modified products thereof with acid anhydride), waxes (such as polyethylene wax), silicone oil and silicone-based resins, fluorine-containing resins (such as polytetrafluoroethylene) and fatty acid esters.

The filler includes inorganic or organic fibrous fillers such as glass fiber, carbon fiber, boron fiber, potassium titanate fiber, metal fiber or aramid fiber; plate-like fillers such as glass flake, mica or graphite; granular fillers such as milled fiber, glass bead, glass balloon, talc, kaolin, silica, diatomaceous earth, clay, wollastonite, alumina, graphite fluoride, silicon carbide, boron nitride or metal powder; and the like.

The mold lubricant includes long-chain fatty acid amides and the like. Acid amides of long-chain fatty acid (monovalent or divalent long-chain fatty acid) and amines (such as monoamines, diamines and polyamines) are usable. Examples of monoamides include primary acid amides of saturated fatty acid such as capramide, laurinamide, myristinamide, palmitinamide, stearamide, arachidamide, behenamide or montanamide; primary acid amides of unsaturated fatty acid such as oleinamide; and secondary acid amides of saturated and/or unsaturated fatty acid and monoamine such as stearylstearamide and stearyloleinamide. Bisamide includes bisamides of $C_{1-6}$ alkylene diamine (particularly, $C_{1-2}$ alkylene diamine) and the above-described fatty acid, and the like, specific examples of which include ethylenediamine-dipalmitinamide, ethylenediamine-distearamide (ethylene-bis-stearylamide), hexamethylenediamine-distearamide, ethylenediamine-dibehenamide, ethylenediamine-dimontanamide, ethylenediamine-dioleinamide, ethylenediamine-dierucamide, and the like. Further, bisamides having a structure in which different acyl groups are bonded to amine sites of an alkylenediamine, such as ethylenediamine-(stearamide)oleinamide and the like are usable. Preferable fatty acid amides are bisamides.

For the colorant, various kinds of dyes and pigments are usable. The dye includes azo-based dyes, anthraquinone-based dyes, phthalocyanine-based dyes, naphthoquinone-based dyes, and the like. For the pigment, both of inorganic pigments and organic pigments are usable. Examples of inorganic pigments include titanium-based pigments, zinc-based pigments, carbon black, iron-based pigments, molybdenum-based pigments, cadmium-based pigments, lead-based pigments, cobalt-based pigments and aluminum-based pigment; and examples of organic pigments include azo-based pigments, anthraquinone-based pigments, phthalocyanine-based pigments, quinacridone-based pigments, perylene-based pigments, perynon-based pigments, isoindoline-based pigments, dioxazin-based pigments and threne-based pigments. Among these, the use of carbon black, titanium oxide, a phthalocyanine-based pigment or a perylene-based pigment, which is a colorant having high light-shielding effects, can also improve weathering (light) resistance. The quantity of the colorant to be compounded is not particularly limited, and a quantity for general coloring purpose is used.

The production method of the polyacetal resin composition of the invention is not particularly limited. The composition can be prepared by various methods conventionally known as the preparation method of a resin composition. For example, such methods can be adopted as (1) a method in which all components constituting a composition are mixed and fed to an extruder to be molten and kneaded to obtain a pellet-like composition, (2) a method in which a part of components constituting a composition is fed from a main feed opening and the residual components are fed from a side feed opening, which are then molten and kneaded to obtain a pellet-like composition, and (3) a method in which pellets having different compositions are once prepared by extrusion or the like, and pellets obtained are mixed to be adjusted to a predetermined composition.

In the preparation of the composition using an extruder, the use of an extruder having one or more degassing vent openings is preferable. Further, it is preferable to supply water or low-boiling alcohols to an arbitrary place from the main feed opening to the degassing vent opening in about 0.1 to 10 parts by weight relative to 100 parts by weight of the polyacetal resin and to degas and remove formaldehyde and the like generated in the extrusion process along with the water or low-boiling alcohols from the degassing vent opening. This makes it possible to further reduce the quantity of formaldehyde generated from the polyacetal resin composition and molded articles thereof.

The present invention also includes recycling molded articles composed of the above-described polyacetal resin composition and the polyacetal resin composition colored according to the above. Specifically, it is a recycled resin composition formed by melting, kneading and extruding a molded article composed of these resin compositions or a pulverized product thereof, alone or with a resin substance having the same or different composition or a molded article thereof; and it is a recycled molded article obtained by melting, kneading and molding a molded article composed of these resin compositions or a pulverized product thereof, alone or with a resin substance having the same or different composition or a molded article thereof. The recycled resin composition and recycled molded article prepared by being subjected to the repetition of melting thermal history as described above are also ones for which the generation of formaldehyde is maintained to extremely low levels, in the same way as the polyacetal resin composition being the base thereof.

The present invention also includes a polyacetal resin composition prepared by adding a colorant to the above-described polyacetal resin composition, and melting and kneading the same using an extruder having a vent opening while performing degassing from the vent at a pressure reduction degree of −400 mmHg or lower (absolute pressure of 360 mmHg or lower). The pressure reduction degree is preferably −500 mmHg or lower (absolute pressure of 260 mmHg or lower), more preferably −600 mmHg or lower (absolute pressure of 160 mmHg or lower). A colored resin composition prepared by being subjected to such repetition of melting thermal history is also one for which the generation of formaldehyde is maintained to extremely low levels, in the same way as the polyacetal resin composition being the base thereof.

Molded articles formed with the polyacetal resin composition of the present invention, and molded articles formed with the polyacetal resin composition prepared by adding a colorant to the aforementioned polyacetal resin composition generate an extremely small quantity of formaldehyde. Specifically, as the generation quantity of formaldehyde according to the measurement method described in the section of Examples, 2.0 μg/g or smaller is possible per unit weight of the molded article, preferably 1.0 μg/g or smaller is possible, and further preferably 0.6 μg/g or smaller is possible. These are extremely low levels compared with the generation quantity of formaldehyde, which is within the range of about 5 to 20 μg/g per unit weight, from molded articles composed of a polyacetal resin generally offered commercially. Further, molded articles composed of a recycle resin composition prepared by collecting these molded articles or the pulverized product thereof and melting and kneading the same, or molded articles formed by melting, kneading and directly molding collected molded articles or the pulverized product thereof are ones with an extremely small generation of formaldehyde in the same way as described above. The generation quantity of formaldehyde is near the above-described levels.

The polyacetal resin composition of the present invention is composed of a selective combination of a specified polyacetal copolymer and compounding components, and can significantly suppress the generation of formaldehyde by oxidation or thermal decomposition of the polyacetal copolymer in a molding and processing and the like, to allow work environment to be improved. In addition, the adherence of decomposed products or additives to a mold (mold deposit), and the exudation of decomposed products or additives from molded articles can significantly be suppressed and thus various problems at molding and processing can be improved. Consequently, the resin composition of the present invention is useful for molding various molded articles by usual molding methods such as, for example, injection molding, extrusion molding, compression molding, blow molding, vacuum moldings foaming molding, rotating molding and gas injection molding.

In addition, the polyacetal resin composition of the present invention is excellent also in weathering (light) resistance due to the selective combination of a specified polyacetal copolymer and compounding components, and can be employed for applications that require weathering (light) resistance.

The resin composition of the present invention has no limitation on the utilization field thereof for molded articles, and can favorably be used for applications that strongly require the reduction of the generation of formaldehyde, such as, for example, automotive parts, electric/electronic parts, precision machine parts, building materials, piping parts, articles for daily use, articles for dressing and parts for medical devices.

Examples

Hereinafter, the present invention will be described more specifically based on Examples, but is not limited by these Examples.

In Examples and Comparative Examples, the generation quantity of formaldehyde from a molded article, and weathering (light) resistance were evaluated as follows.

[Generation Quantity of Formaldehyde from Molded Article]

Using polyacetal resin compositions prepared in Examples and Comparative Examples, a tabular test piece (100 mm×40 mm×2 mm) was molded by injection molding (molding temperature: 190° C.). Two of the tabular test pieces (the total weight of about 22 g was weighed accurately) were hung from the lid of a bottle (volume: 1 L) made of polyethylene containing 50 ml of distilled water, which was sealed and left in a constant-temperature chamber at a temperature of 60° C. for three hours, and then left at rest at room temperature for one hour. The quantity of formaldehyde, which had been generated from the tabular test pieces and had been absorbed by distilled water in the bottle made of polyethylene, was quantitatively measured according to JIS K0102, 29 (section of formaldehyde), and the generation quantity of formaldehyde per the unit weight of the test piece (μg/g) was calculated.

[Weathering (Light) Resistance]

A tabular molded article (70 mm×40 mm×3 mm) was irradiated with a UV fade meter [UV auto fade meter FAL-AU·H·B·EM, manufactured by SUGA TEST INSTRUMENTS] under a fade condition of 83° C. for 400 hours, which was then taken out and evaluated for the existence or nonexistence of cracks on the surface of the test piece, change in hue (ΔE) between before and after the irradiation, and the retention (%) of the glossiness.

Existence or Nonexistence of Cracks

The surface of the test piece was visually observed to determine the existence or nonexistence of cracks.

Change in Hue (ΔE)

The hue (L*, a*, b*) of a molded article was measured with a type Z-300A color sensor manufactured by NIPPON DENSHOKU, and the change in the hue was calculated using the following formula:

$$\Delta E = \{(L^*_1 - L^*_0)^2 + (a^*_1 - a^*_0)^2 + (b^*_1 - b^*_0)^2\}^{1/2}$$

where $L^*_0$, $a^*_0$ and $b^*_0$ represent the initial hue (L*, a*, b*), and $L^*_1$, $a^*_1$ and $b^*_1$ represent the hue (L*, a*, b*) after the irradiation. A smaller value shows a smaller change in the hue.

Retention of Glossiness

The glossiness (measurement angle: 60 degrees) of the molded article was measured with a portable gloss meter HG-246 manufactured by SUGA TEST INSTRUMENTS to calculate the retention (%) using the following formula:

Retention(%) of glossiness=(initial glossiness)/(glossiness after the irradiation)×100

A larger value shows a smaller lowering of the gloss.

[Exudation Properties]

The tabular molded article (70 mm×40 mm×3 mm) was treated under the condition of 65° C. and 95% RH for 48 hours, the surface of which was then visually observed to evaluate the exudation on the basis of following grades.

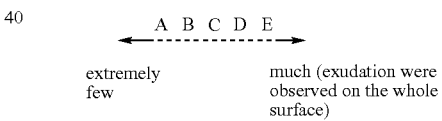

extremely few      much (exudation were observed on the whole surface)

Examples 1 to 13

To 100 parts by weight of a polyacetal copolymer having a specified polymer quality indicator, a hindered phenol-based antioxidant, a guanamine compound, a hindered amine stabilizer in which the nitrogen in a piperidine derivative was tertiary, a UV absorber, a fatty acid ester consisting of fatty acid and polyalkylene glycol, polyalkylene glycol and other compounds were pre-blended at a ratio as shown in Table 1, which was then thrown into the main feed opening of a 30 min diameter twin-screw extruder having one vent opening and molten and mixed (extrusion condition: L/D=35, extrusion temperature=200° C., screw rotation number=120 rpm, vent vacuum=−700 mmHg, discharge rate=18 kg/hr) to prepare a pellet-shaped composition. Further, for evaluating weathering (light) resistance and exudation properties, a pellet-shaped composition was prepared by blending 0.3 parts by weight of pigment (red iron oxide) to 100 parts by weight of the above-described pellet-shaped composition and throwing again the blended product into the main feed opening of the 30 mm diameter twin-screw extruder having one vent opening and molten and mixed (extrusion condition: L/D=35, extrusion temperature=200° C., screw rotation number=120 rpm, vent vacuum=−700 mmHg, discharge rate=18 kg/hr).

By using these, predetermined tabular test pieces were molded with an injection-molding machine having a cylinder temperature set at 190° C. to perform the evaluation of the generation of formaldehyde from the molded article, and the like. Results are shown in Table 1.

Comparative Examples 1 to 12

For comparison, a product that was prepared by using a hindered amine stabilizer in which the nitrogen in a piperidine derivative was not tertiary and a polyacetal copolymer having a different polymer quality indicator; and products that did not satisfy the requirement of the present invention for the compounding ratio of the (B) hindered phenol-based antioxidant to the (D) hindered amine stabilizer, (B/D), or the requirement for the compounding ratio of the (D) hindered amine stabilizer to the (E) UV absorber, (D/E), or the requirement for the total compounding quantity of the (D) hindered amine stabilizer and the (E) UV absorber, (D+E), were evaluated in the same way as in the Example. Results are shown in Table 2.

Polyacetal copolymers, hindered phenol-based antioxidants, guanamine compounds, hindered amine stabilizers, UV absorbers, fatty acid esters, polyalkylene glycols and other compounds used in Examples and Comparative Examples are as follows.

A. Polyacetal Copolymer (a-1) polyacetal copolymer [a polyacetal copolymer in which the quantity of a hemiformal terminal group containing 0.03% by weight of ethylene-bis(oxyethylene)bis[3-(3-(5-t-butyl-4-hydroxy-m-tolyl)propionate)=0.38 mmol/kg, the quantity of a formyl terminal group=0.03 mmol/kg, the quantity of an unstable terminal group=0.15% by weight, the melt index=9 g/10 min]

Using a twin screw paddle type continuous polymerization machine, trioxane, to which 2.5% (in the whole monomer) of 1,3-dioxolan having been incorporated with 0.03% by weight of ethylene-bis(oxyethylene)bis[3-(3-(5-t-butyl-4-hydroxy-m-tolyl)propionate relative to the total monomer (trioxane+1,3-dioxolan) was added, was continuously fed, and polymerization was performed using boron trifluoride as a catalyst (catalyst concentration: $2 \times 10^{-3}$ mol %) fed to the same portion at the same time. Meanwhile, the concentration of impurities in the monomer used at that time were $3 \times 10^{-3}$ mol % for water, $1 \times 10^{-3}$ mol % for methanol and $1 \times 10^{-3}$ mol % for formic acid.

To the polymer discharged from the discharge opening of the polymerization machine, an aqueous solution containing 1000 ppm of triethylamine was added just after the discharge, which was then subjected to mixing and pulverization and, at the same timer stirring treatment. Subsequently, centrifugation and drying were performed to obtain a polymer in which the catalyst had been deactivated.

The polymer was fed to the twin screw extruder having a vent opening to be molten and kneaded at a resin temperature of about 220° C. to remove unstable terminals while reduced-pressure degassing being performed at the vent opening, to obtain a pellet-shaped polymer.

Next, by using a heat-insulating cylindrical pressure tight vessel, while the pellet-shaped polymer being continuously fed from the upper portion of the vessel and a 500 ppm % triethylamine aqueous solution being fed at 135° C. from the lower portion, treatment was performed for 8 hours. Then, centrifugation and drying were performed to give an intended polymer.

(a-2): polyacetal copolymer [a polyacetal copolymer in which the quantity of a hemiformal terminal group containing 0.04% by weight of pentaerythritol tetrakis[3-(3,5-di-t-butyl-4-hydroxyphenyl)propionate]=1.20 mmol/kg, the quantity of a formyl terminal group=2.26 mmol/kg, the quantity of an unstable terminal group=0.6% by weight, the melt index=9 g/10 min]

By using a twin-screw paddle type continuous polymerization machine, trioxane, to which 2.5% (in the whole monomer) of 1,3-dioxolan having been incorporated with 0.04% by weight of pentaerythritol tetrakis[3-(3,5-di-t-butyl-4-hydroxyphenyl)propionate] relative to the total monomer (trioxane+1,3-dioxolan) was added, was continuously fed, and polymerization was performed using boron trifluoride as a catalyst (catalyst concentration: $2 \times 10^{-3}$ mol %) fed to the same portion at the same time.

To the polymer discharged from the discharge opening of the polymerization machine, an aqueous solution containing 1000 ppm of triethylamine was added just after the discharge, which was then subjected to mixing and pulverization and, at the same time, stirring treatment. Subsequently, centrifugation and drying were performed to obtain a polymer in which the catalyst had been deactivated.

The polymer was fed to the twin screw extruder having a vent opening to be molten and kneaded at a resin temperature of about 220° C. to remove unstable terminals while reduced-pressure degassing being performed at the vent opening, to obtain a pellet-shaped polymer. Then, centrifugation and drying were performed to give an intended polymer.

Meanwhile, the quantity of the hemiformal terminal group and formyl terminal group of the polyacetal copolymer is the value (mmol/kg) obtained by performing the measurement according the method described in JP-A 2001-11143 with a type AVANCE400 FT-NMR apparatus manufactured by Bruker.

The quantity of unstable terminal group was obtained as follows. 1 g of the polyacetal copolymer was put in a pressure tight vessel with 100 ml of a 50% (volume %) methanol aqueous solution containing 0.5% (volume %) of ammonium hydroxide and heat-treated at 180° C. for 45 minutes, which was then cooled and opened. Subsequently, the quantity of formaldehyde decomposed and dissolved in the obtained solution was measured quantitatively and the value was represented in % by weight relative to the polyacetal copolymer.

The above-described melt index is a value (g/10 min) obtained under the condition of 190° C. and 2160 g according to ASTM-D1238.

B. Hindered Phenol-Based Antioxidant (b-1): ethylene-bis(oxyethylene)bis-[3-(3-(5-t-butyl-4-hydroxy-m-tolyl)propionate) (IRGANOX245)

(b-2): pentaerythritol tetrakis[3-(3,5-di-t-butyl-4-hydroxyphenyl)propionate] (IRGANOX1010)

C. Guanamine Compound, Hydrazide Compound (c-1): benzoguanamine (c-2): CTU-guanamine [manufactured by Ajinomoto Fine-Techno]

(c-3): dihydrazide sebacate

D. Hindered Amine Stabilizer

The hindered amine stabilizer in which the nitrogen in the piperidine derivative having a steric hindrance group is tertiary (d-1): condensation product of 1,2,3,4-butane tetracarboxylic acid, 1,2,2,6,6,-pentamethyl-4-piperidinol and β,β,β',β'-tetramethyl-3,9-(2,4,8,10-tetraoxaspiro[5,5]undecane)-diethanol (ADEKASTAB LA-63P)

(d-2): tetrakis(1,2,2,6,6-pentamethyl-4-piperidyl)1,2,3,4-butane tetracarboxylate (ADEKASTAB LA-52)

(d-3): condensation product of 1,2,3,4-butane tetracarboxylic acid, 1,2,2,6,6-pentamethyl-4-piperidinol and tridecyl alcohol (ADEKASTAB LA-62)

(d-4): polymerization product of dimethyl succinate and 4-hydroxy-2,2,6,6-tetramethyl-1-piperidine ethanol (TINUVIN 622LD)

(d-5): mixture of bis(1,2,2,6,6-pentamethyl-4-piperidyl)-carboxylate and methyl-1,2,2,6,6-pentamethyl-4-piperidylsebacate (TINUVIN 765)

The hindered amine stabilizer in which the nitrogen in a piperidine derivative having a steric hindrance group is secondary (d-6): bis(2,2,6,6-tetramethyl-4-piperidyl)sebacate (TINUVIN 770DF)

(d-7): condensation product of 1,2,3,4-butane tetracarboxylic acid 2,2,6,6,-tetramethyl-4-piperidinol and β,β,β',β'-tetramethyl-3,9-(2,4,8,10-tetraoxaspiro[5,5]undecane)-diethanol (ADEKASTAB LA-68)

(d-8): tetrakis(2,2,6,6-tetramethyl-4-piperidyl)1,2,3,4-butane tetracarboxylate (ADEKASTAB LA-57)

(d-9): condensation product of 1,2,3,4-butane tetracarboxylic acid, 2,2,6,6,-tetramethyl-4-piperidinol and tridecyl alcohol (ADEKASTAB LA-67)

E. UV Absorber (e-1): 2-(2H-benzotriazole-2-yl)-4,6-bis(1-methyl-1-phenylethyl)phenol (TINUVIN 234)

(e-2): N-(2-ethylphenyl)-N'-(2-ethoxy-phenyl)oxalic diamide (Sanduvor VSU)

F. Fatty Acid Ester Consisting of Fatty Acid and Polyalkylene Glycol, and Polyalkylene Glycol (f-1): polyethylene glycol monostearic acid ester (average polymerization degree of polyethylene glycol: 90) (nonion S-40)

(f-2): polyethylene glycol (average molecular weight: about 8300) (PEG-6000S)

G. Others (g-1): calcium 12-hydroxystearate (g-2): ethylene bisstearylamide

TABLE 1

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Polyacetal copolymer | Part by weight | a-1 100 | a-1 100 | a-1 100 | a-1 100 | a-1 100 | a-1 100 | a-1 100 | a-1 100 | a-1 100 | a-1 100 | a-1 100 | a-1 100 | a-1 100 |
| Hindered phenol-based antioxidant (B)* | Part by weight | b-1 0.03 | b-1 0.1 | b-1 0.1 | b-1 0.1 | b-1 0.1 | b-1 0.03 | b-1 0.1 | b-1 0.1 | b-1 0.03 | b-1 0.03 | b-1 0.1 | b-1 0.1 | b-1 0.1 |
| Hindered amine stabilizer (D) | Part by weight | d-1 0.5 | d-1 0.5 | d-1 0.5 | d-1 0.5 | d-2 0.3 | d-3 0.5 | d-3 0.5 | d-3 0.5 | d-4 1 | d-5 0.5 | d-5 0.5 | d-5 0.5 | d-1 0.5 |
| Ratio of (B) hindered phenol-based antioxidant to (D) hindered amine stabilizer, (B/D) | Part by weight | 0.06 | 0.20 | 0.20 | 0.20 | 0.33 | 0.06 | 0.20 | 0.20 | 0.03 | 0.06 | 0.20 | 0.20 | 0.20 |
| UV absorber (E) | Part by weight | e-1 0.5 | e-1 0.5 | e-1 0.3 e-2 0.3 | e-1 0.5 | e-1 0.5 | e-1 0.5 | e-1 0.5 | e-1 0.5 | e-1 0.5 | e-1 0.5 | e-1 0.5 | e-1 0.5 | e-1 0.5 |
| Ratio of (D) hindered amine stabilizer to (E) UV absorber, (D/E) | Part by weight | 1.0 | 1.0 | 0.8 | 1.0 | 0.6 | 1.0 | 1.0 | 1.0 | 2.0 | 1.0 | 1.0 | 1.0 | 1.0 |
| Total quantity of (D) hindered amine stabilizer and (E) UV absorber, (D + E) | Part by weight | 1.0 | 1.0 | 1.1 | 1.0 | 0.8 | 1.0 | 1.0 | 1.0 | 1.5 | 1.0 | 1.0 | 1.0 | 1.0 |
| Guanamine compound, hydrazide compound | Part by weight | c-1 0.5 | c-1 0.5 | c-1 0.5 | c-2 0.3 | c-2 0.5 | c-1 0.5 | c-1 0.5 | c-1 0.5 | c-1 0.5 | c-2 0.5 | c-2 0.5 | c-2 0.5 | c-3 0.1 |
| Fatty acid | Part by | | f-1 | f-1 | f-2 | | | f-1 | f-2 | | | | f-1 | f-1 |

TABLE 1-continued

|  |  | Examples |  |  |  |  |  |  |  |  |  |  |  |  |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 |
| ester, polyalkylene glycol | weight |  | 0.5 | 0.5 |  | 0.5 |  |  | 0.5 | 0.3 |  |  | 0.5 | 0.5 |
| Others | Part by weight | g-1 0.1 | g-1 0.1 | g-1 0.1 | g-1 0.1 | g-1 0.1 | g-1 0.1 | g-1 0.1 | g-1 0.1 | g-1 0.1 | g-1 0.1 | g-1 0.1 | g-1 0.1 | g-1 0.1 |
|  |  | g-2 0.2 | g-2 0.2 | g-2 0.2 | g-2 0.2 | g-2 0.2 | g-2 0.2 | g-2 0.2 | g-2 0.2 | g-2 0.2 | g-2 0.2 | g-2 0.2 | g-2 0.2 | g-2 0.2 |
| Generation quantity of formaldehyde (μg/g) |  | 1.8 | 1.0 | 1.5 | 1.1 | 1.2 | 1.4 | 1.5 | 0.9 | 1.8 | 1.9 | 1.3 | 1.4 | 0.3 |
| Existence or nonexistence of cracks |  | None | None | None | None | None | None | None | None | None | None | None | None | None |
| ΔE |  | 1.4 | 1.3 | 2.8 | 1.2 | 2.6 | 1.2 | 1.3 | 3.3 | 3.8 | 0.7 | 0.9 | 1.3 | 1.9 |
| Retention of glossiness (%) |  | 95 | 93 | 92 | 97 | 87 | 89 | 92 | 86 | 95 | 96 | 99 | 93 | 91 |
| Exudation |  | A | A | A | B | B | A | A | A | A | B | B | B | B |

*Includes the quantity of the hindered phenol-based antioxidant included in the polyacetal copolymer

TABLE 2

|  |  | Comparative Examples |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| Polyacetal copolymer | Part by weight | a-2 100 | a-1 100 | a-1 100 | a-1 100 | a-1 100 | a-1 100 | a-1 100 | a-1 100 | a-1 100 | a-1 100 | a-1 100 | a-1 100 |
| Hindered phenol-based antioxidant (B)* | Part by weight | b-2 0.04 | b-1 0.03 | b-1 0.1 | b-1 0.1 | b-1 0.1 | b-1 0.1 | b-1 0.1 | b-1 0.1 | b-1 0.1 | b-1 0.1 | b-1 0.1 | b-1 0.1 |
| Hindered amine stabilizer (D) | Part by weight | d-1 0.5 | d-6 0.2 | d-6 0.5 | d-7 0.5 | d-8 0.5 | d-9 0.5 | d-2 0.5 | d-2 1.2 | d-2 0.2 | d-2 1 | d-2 0.2 | d-2 1 |
| Ratio of (B) hindered phenol-based antioxidant to (D) hindered amine stabilizer, (B/D) | Part by weight | 0.08 | 0.15 | 0.2 | 0.2 | 0.2 | 0.2 | 0.6 | 0.025 | 0.5 | 0.1 | 0.5 | 0.1 |
| UV absorber (E) | Part by weight | e-1 0.5 | e-1 0.4 | e-1 0.4 | e-1 0.4 | e-1 0.4 | e-1 0.4 | e-1 0.5 | e-1 0.5 | e-1 1 | e-1 0.2 | e-1 0.2 | e-1 1 |
| Ratio of (D) hindered amine stabilizer to (E) UV absorber, (D/E) | Part by weight | 1.0 | 0.5 | 1.3 | 1.3 | 1.3 | 1.3 | 1.0 | 2.0 | 0.2 | 5.0 | 1.0 | 1.0 |
| Total quantity of (D) hindered amine stabilizer and (E) UV absorber, (D + E) | Part by weight | 1.0 | 0.6 | 0.9 | 0.9 | 0.9 | 0.9 | 1.0 | 1.5 | 1.2 | 1.2 | 0.4 | 2.0 |
| Guanamine compound, hydrazide compound | Part by weight | c-1 0.5 | c-3 0.2 | c-1 0.5 | c-1 0.5 | c-1 0.5 | c-1 0.5 | c-1 0.5 | c-1 0.5 | c-1 0.5 | c-1 0.5 | c-1 0.5 | c-1 0.5 |
| Fatty acid ester, polyalkylena glycol | Part by weight |  |  | f-1 0.5 | f-1 0.5 | f-1 0.5 | f-1 0.5 |  |  | f-1 0.5 | f-1 0.5 | f-1 0.5 | f-1 0.5 |
| Others | Part by weight | g-1 0.1 g-2 0.2 | g-2 0.2 | g-1 0.1 g-2 0.2 | g-1 0.1 g-2 0.2 | g-1 0.1 g-2 0.2 | g-1 0.1 g-2 0.2 | g-1 0.1 g-2 0.2 | g-1 0.1 g-2 0.2 | g-1 0.1 g-2 0.2 | g-1 0.1 g-2 0.2 | g-1 0.1 g-2 0.2 | g-1 0.1 g-2 0.2 |
| Generation quantity of formaldehyde (μg/g) |  | 4.2 | 21.5 | 4.1 | 4.5 | 5.0 | 4.2 | 1.3 | 1.8 | 1.5 | 1.6 | 1.5 | 1.5 |
| Existence or nonexistence of cracks |  | None | None | None | None | None | None | Exist | None | None | None | Exist | None |
| ΔE |  | 0.6 | 1.1 | — | — | — | — | 4.9 | 2.1 | 2 | 3.5 | 5.8 | 1.8 |
| Retention of glossiness (%) |  | 98 | 96 | — | — | — | — | 75 | 71 | 62 | 78 | 79.8 | 58 |
| Exudation |  | A | B | A | A | A | A | A | D | E | C | A | E |

*Includes the quantity of the hindered phenol-based antioxidant included in the polyacetal copolymer As is clear from Tables, when polyacetal compositions of Examples are used, the molded article generates an extremely small quantity of formaldehyde, and also has excellent weathering (light) resistance, when compared with Comparative Examples. Consequently, the polyacetal composition of the present invention can favorably be used for various molded articles that require low formaldehyde generation and weathering (light) resistance, for example, molded articles for building materials and car interior furnishing.

The invention claimed is:

1. A polyacetal resin composition which comprises a blend of:
   (A) 100 parts by weight of a polyacetal copolymer having 1.0 mmol/kg or smaller quantity of a hemiformal terminal group, 2.0 mmol/kg or smaller quantity of a formyl terminal group, and 0.5% by weight or smaller quantity of unstable terminal groups which decompose in response to exposure to heat and a base to form formaldehyde;
   (B) 0.03 to 0.30 parts by weight of a hindered phenol-based antioxidant;
   (C) 0.05 to 0.8 parts by weight of at least one compound selected from the group consisting of (c-1) a guanamine compound and (c-2) a hydrazide compound;
   (D) 0.2 to 1 part by weight of at least one hindered amine stabilizer selected from the group consisting of tetrakis(1,2,2,6,6-pentamethyl-4-piperidyl)1,2,3,4-butane tetracarboxylate, condensation products of 1,2,3,4-butanetetracarboxylic acid, 1,2,2,6,6-pentamethyl-4-piperidinol and $\beta,\beta,\beta',\beta'$-tetramethyl-3,9-(2,4,8,10-tetraoxaspiro[5,5]undecane)-diethanol; and polymerization products of dimethyl succinate and 4-hydroxy-2,2,6,6-tetramethyl-1-piperidine ethanol; and
   (E) 0.2 to 1 part by weight of a UV absorber, wherein
   the hindered phenol-based antioxidant (B) and the hindered amine stabilizer (D) are present in amounts to achieve a mixing ratio (B/D) within the range of 0.03 to 0.5, and wherein
   the hindered amine stabilizer (D) and the UV absorber (E) are present in amounts to achieve a mixing ratio (D/E) within the range of 0.5 to 2.0, and wherein
   the total amount (D+E) of the hindered amine stabilizer (D) and the UV absorber (E) is within the range of 0.5 to 1.5 parts by weight.

2. The polyacetal resin composition according to claim 1, wherein the UV absorber (E) is at least one selected from the group consisting of benzotriazole-based UV absorbers and anilide oxalate-based UV absorbers.

3. The polyacetal resin composition according to claim 1, further comprising at least one additional component (F) selected from the group consisting of a fatty acid ester (f-1) and a polyalkylene glycol (f-2).

4. The polyacetal resin composition according to claim 1, wherein the UV absorber is at least one selected from the group consisting of 2-(2H-benzotriazole-2-yl)-4,6-bis(1-methyl-1-phenylethyl)phenol and N-(2-ethylphenyl)-N'-(2-ethoxy-phenyl)oxalic diamide.

* * * * *

UNITED STATES PATENT AND TRADEMARK OFFICE
CERTIFICATE OF CORRECTION

| | | |
|---|---|---|
| PATENT NO. | : 7,893,140 B2 | Page 1 of 1 |
| APPLICATION NO. | : 12/306792 | |
| DATED | : February 22, 2011 | |
| INVENTOR(S) | : Hase | |

It is certified that error appears in the above-identified patent and that said Letters Patent is hereby corrected as shown below:

Column 24, line 25, after "UV Absorber" insert --(E)--.

Signed and Sealed this
Twenty-third Day of August, 2011

David J. Kappos
*Director of the United States Patent and Trademark Office*